United States Patent [19]
Sato

[11] Patent Number: 4,840,038
[45] Date of Patent: Jun. 20, 1989

[54] CONTROL DEVICE FOR USE IN A REFRIGERATION CIRCUIT

[75] Inventor: Motoharu Sato, Honjo, Japan

[73] Assignee: Sanden Corporation, Gunma, Japan

[21] Appl. No.: 129,669

[22] Filed: Dec. 7, 1987

[30] Foreign Application Priority Data

Dec. 6, 1986 [JP] Japan ............................. 61-87389[U]

[51] Int. Cl.$^4$ ............................................. F25B 41/04
[52] U.S. Cl. ........................................ 62/210; 62/222
[58] Field of Search ................ 62/208, 209, 210, 203,
62/204, 205, 206, 190, 511, 222, 224

[56] References Cited

U.S. PATENT DOCUMENTS

| | | | |
|---|---|---|---|
| 2,415,338 | 2/1947 | Carter | 62/210 |
| 3,367,130 | 2/1968 | Owens | 62/222 |
| 3,564,865 | 2/1971 | Spencer et al. | 62/197 |
| 3,638,446 | 2/1972 | Palmer | 62/209 |
| 4,145,163 | 3/1979 | Fogelberg et al. | 417/222 |
| 4,324,112 | 4/1982 | Fujiwara et al. | 62/511 |
| 4,429,552 | 2/1984 | Reedy | 62/528 |
| 4,633,674 | 1/1987 | Sato | 62/197 |

Primary Examiner—Harry B. Tanner
Attorney, Agent, or Firm—Banner, Birch, McKie & Beckett

[57] ABSTRACT

An improved control device for a refrigeration circuit including a tubular casing having three spaced walls on its interior surface is disclosed. The first wall is a plurality of holes, the second wall has a longitudinal bore with a valve seat facing the first wall and the third wall includes at least one hole. A first bellows is attached to the inner surface of the first wall in the region between the first and second walls and has a valve element at its other end. The valve element includes a spherical sealing element which fits within the valve seat to control the flow of refrigerant through the longitudinal bore. A second bellows is attached to the interior surface of the third wall and has a valve control element extending from its other end into the longidudinal bore. When the level of refrigerant is below a predetermined level, the first bellows expands and the spherical sealing element contacts the valve seat preventing fluid flow through the longitudinal bore. This situation causes an abnormal reduction of pressure at the inlet side of the compressor, potentially causing the compressor to malfunction. A malfunction of the compressor is prevented by operation of the second bellows which expands due to the decreased pressure in the region between the second and third walls. Therefore, the valve control element is moved to the left, contacting the spherical sealing element and forcing it away from the valve seat to allow fluid to flow through the longitudinal bore.

8 Claims, 1 Drawing Sheet

CONTROL DEVICE FOR USE IN A REFRIGERATION CIRCUIT

BACKGROUND OF THE INVENTION

1. Field of Invention

This invention relates to a control device for use in a refrigeration circuit, and more particularly, to an improved device for controlling the volume of flow of refrigerant in a refrigeration circuit.

2. Description of The Prior Art

FIG. 1 shows a conventional refrigeration circuit for use, for example, in an automobile air conditioning system. The circuit includes compressor 1, condenser 2, control device 3, capillary 4, evaporator 5 and accumulator 6 serially connected. The output of accumulator 6 is also connected to the input of compressor 1.

With reference to FIG. 2, control device 3 includes tubular casing 31 through which refrigerant flows in the direction of the arrow. First wall 32 and second wall 33 are disposed on the interior surface of tubular casing 31 and are fixed a predetermined distance apart. First wall 32 and second wall 33 enclose interior chamber 36 of control device 3. First wall 32 has a plurality of holes 321 and second wall 33 has longitudinal bore 331. Longitudinal bores 331 widens into valve seat 332 on the interior side of second wall 33, that is, the side facing interior chamber 36.

Bellows 34 is disposed in interior region 36 and is fixed at one end to first wall 32. Valve element 35 is fixed at one end to the other end of bellows 34 and extends into spherical sealing element 37 at its other end. Spherical sealing element 37 engages valve seat 332 to control the flow of refrigerant fluid through longitudinal bore 331.

Bellows 34 contains a fluid which is either the same refrigerant used in the refrigeration circuit or is a fluid which has a greater saturation pressure than the refrigerant used in the refrigeration circuit. The fluid within bellows 34 is maintained in a saturated state and, therefore, the pressure of the fluid depends upon the temperature of the refrigerant in tubular casing 31. Bellows 34 will expand due to the pressure of the fluid within and due to its recoil strength. When bellows 34 expands, valve element 35 moves to the right in FIG. 2. However, bellows 34 will contract due to the pressure of the refrigerant within tubular casing 31. When bellows 34 contracts, valve element 35 moves to the left in FIG. 2. Control device 3 operates to maintain a balance between these opposing pressures and therefore, the operation of control device 3 is dependent on the degree of subcooling of the refrigerant at the outlet side of condenser 2.

In operation, if compressor 1 is not driven, the refrigerant fluid stagnates in the refrigeration circuit. In this situation, the pressure of the refrigerant at the outlet side of condenser 2 will always be less than the combination of the pressure of the fluid within bellows 34 and its recoil strength. Bellows 34 expands moving valve element 35 to the right in FIG. 2. The spherical sealing element of valve element 35 closes valve seat 332 of longitudinal bore 331. Valve seat 332 will remain closed until compressor 1 is driven and fluid circulates in the conduit between condenser 2 and control device 3.

When the conduit between condenser 2 and control device 3 is filled with refrigerant and the pressure of the refrigerant at the outlet of condenser 2 is greater than the combination of the pressure of the fluid within bellows 34 and the recoil strength of bellows 34, bellows 34 contracts moving valve element 35 to the left. Valve seat 332 is opened in accordance with the degree of movement of valve element 35. The degree of opening of valve seat 332 is therefore dependent on the degree of subcooling of the refrigerant. The size of the opening at valve seat 332 increases as the degree of subcooling of the refrigerant increases. Therefore, the degree of subcooling of the refrigerant fluid is maintained constant by the operation of the bellows 34. The desired degree of subcooling for the refrigerant can be predetermined by selection of the refrigerant and the recoil strength of bellows 34.

If the level of refrigerant in the refrigeration circuit becomes insufficient, the refrigerant will assume both the liquid state and the gas state. Gas and liquid will be mixed and the temperature of the mixture will become a saturation temperature, that is, since both forms are present in the circuit the refrigerant is saturated at that temperature. The pressure within bellows 34 will increase due to its dependence upon the temperature of the refrigerant within tubular casing 31. Since the refrigerant within bellows 34 is always saturated, and since it has a saturation pressure at least equal to the saturation pressure of the refrigerant fluid in the circuit, bellows 34 will expand to the right. Operating valve 35 will close valve seat 332 of longitudinal bore 331. The volume of the refrigerant which circulates is immediately reduced and the pressure of the refrigerant at the outlet side of compressor 1 will be abnormally decreased. As a result, the degree of superheating of the refrigerant at the inlet side of compressor 1 will be rapidly increased, and the functioning of compressor 1 may be abruptly stopped.

SUMMARY OF THE INVENTION

It is an object of this invention to provide a control device for a refrigeration circuit which prevents abnormal reduction of the pressure at the lower pressure side of the refrigeration circuit.

This object and other objects are accomplished by providing a refrigeration circuit including a compressor, a condenser, a control device, an evaporator and an accumulator. These elements are serially arranged so that refrigerant discharged from the outlet of the compressor circulates through each one and returns to the inlet of the compressor. The control device includes a tubular casing with three walls disposed on its interior surface. The walls are fixed a predetermined distance apart. The first wall includes a plurality of holes and the second wall has a longitudinal bore which widens into a valve seat. The third wall has an orifice. A first bellows is fixed at one end to an interior surface of the first wall in a chamber between the first and second walls. At its other end, the bellows include a valve element for controlling the flow of refrigerant through the longitudinal bore of the second wall. A second bellows is fixed at one end to an interior surface of the third wall in a chamber between the second and third walls and includes a second operating valve attached at its other end. The valve control element extends through the longitudinal bore and acts to displace the valve element to the left opening the longitudinal bore if it has been closed by the valve element when the level of refrigerant fluid is insufficient. Circulation of the refrigerant continues and compressor damage is prevented.

DETAILED DESCRIPTION OF THE PREFERRED EMBODIMENTS

Figure 3:
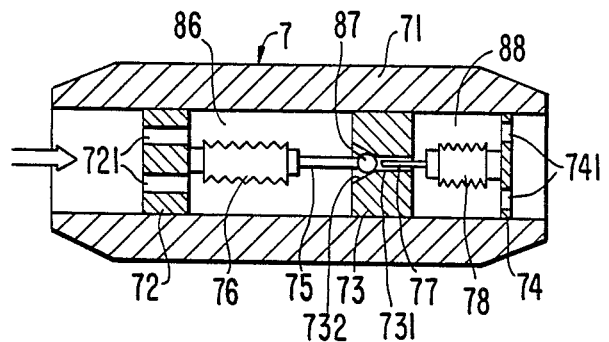
FIG. 3 is a cross-sectional view of a control device in accordance one embodiment of this invention.

FIG. 3 shows a first embodiment of the control device in accordance with this invention. Control device 7 includes tubular casing 71, first wall 72, second wall 73, and third wall 74. The three walls are disposed on the interior surface of tubular casing 71 at a predetermined distance apart. First wall 72 includes a plurality of holes 721 through which refrigerant flows in the direction of the arrow. Second wall 73 includes longitudinal bore 731 which widens into valve seat portion 732 on one side. First wall 72 and second wall 73 enclose interior region 86. First bellows 76 is disposed in interior region 86 and is attached at one end to the interior surface of first wall 72. First bellows 76 includes at its other end valve element 75 which extends into spherical sealing element 87 at its other end. Movement of valve element 75 with respect to valve seat portion 732 controls the flow of refrigerant through longitudinal bore 731.

Third wall 74 includes a plurality of holes 741 for allowing the flow of refrigerant therethrough. Second wall 73 and third wall 74 enclose second interior region 88. Second bellows 78 is disposed in interior region 88 and is attached at one end to the interior surface of third wall 74. Valve control element 77 is attached to the other end of second bellows 78 and extends through longitudinal bore 731 of second wall 73. Valve control element 77 may be a thin shank. First bellows 76 is filled with a fluid which is either the same refrigerant used in the refrigeration circuit or is a fluid which has a greater saturation pressure than the refrigerant used in the refrigeration circuit. The refrigerant within first bellows 76 is maintained in the saturated state. The interior of second bellows 78 is maintained at a vacuum.

In operation, if the level of refrigerant in the refrigeration circuit is insufficient, first bellows 76 extends towards the right and spherical sealing element 87 of valve element 75 seals valve seat portion 732 of longitudinal bore 731 preventing fluid flow therethrough. The pressure of refrigerant at the other side of longitudinal bore 731 will be greatly reduced. Second bellows 78 expands due to its recoil strength. Expansion of second bellows 78 moves valve control element 77 to the left, contacting spherical sealing element 87 of valve element 75. If the pressure is reduced below a predetermined level, valve element 75 is moved to the left as well against the pressure provided by first bellows 76. Valve seat portion 732 of longitudinal bore 731 is opened allowing fluid flow therethrough. Therefore, the pressure at the inlet side of compressor 1 will not be abnormally reduced causing it to malfunction.

Figure 1:
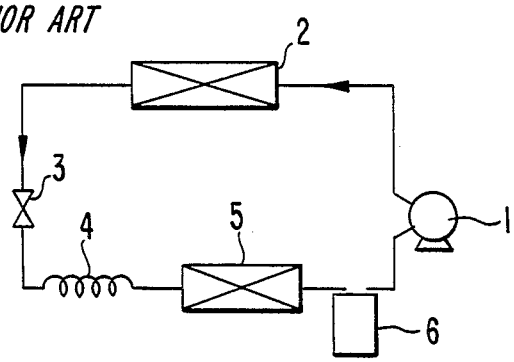
FIG. 1 is a schematic diagram of the refrigeration circuit including a conventional control device.
Figure 2:
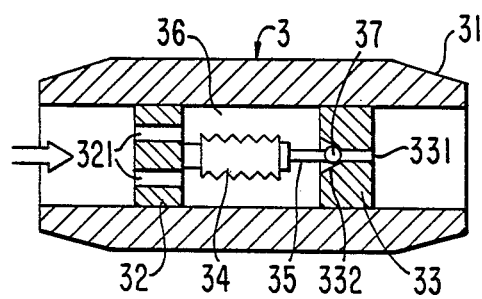
FIG. 2 is a cross-sectional view of a control device shown in FIG. 1.
Figure 4:
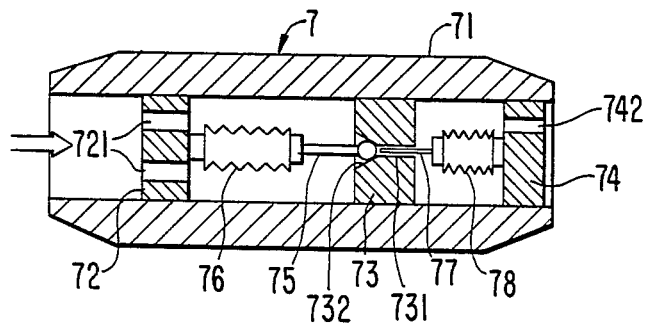
FIG. 4 is a cross-sectional view of a control device in accordance with another embodiment in this invention.

FIG. 4 shows a second embodiment of the present invention which is identical to the first embodiment except that orifice 742 is formed through third wall 74 instead of a plurality of holes 741. Orifice 742 serves as a fixed throttle valve eliminating the need for capillary 4. In this embodiment, control device 7 may be directly connected to evaporator 5 in FIG. 1.

This invention has been described in detail in connection with the preferred embodiments. The preferred embodiments, however, are merely for example only and this invention is not restricted thereto. It will be understood by those skilled in the art, that variations and modifications can be easily made within the scope of this invention, as defined by the appended claims.

I claim:

1. In a refrigeration circuit comprising a compressor, a condenser, a control device, an evaporator and an accumulator serially arranged to form a closed refrigerant circulation path, the improvement comprising said control device including: a tubular casing; a first, second and third wall disposed on an interior surface of said tubular casing; said first wall having a plurality of holes therethrough, said second wall spaced from said first wall and having a longitudinal bore therethrough, and said third wall spaced from said second wall and having at least one hole therethrough;

a first bellows disposed in a region between said first wall and said second wall and having a valve element at one end thereof for controlling a flow of refrigerant through said longitudinal bore in said second wall; and a second bellows disposed in a region between said second wall and said third wall and having a valve control element at one end extending through said longitudinal bore of said second wall, said valve control element contacting said valve element when said valve element has closed fluid flow through said longitudinal bore, said valve control element moving said valve element when the level of refrigerant fluid in said circuit is reduced below a predetermined level to allow fluid flow through said longitudinal bore.

2. The refrigeration circuit of claim 1 wherein said at least one hole of said third wall is an orifice.

3. The refrigeration circuit of claim 1 wherein said first bellows contains a saturated fluid having a saturation pressure equal to or greater than the saturation pressure of said refrigerant, wherein said first bellows expands or contracts in response to the temperature of refrigerant in the refrigeration circuit at the outlet side of the condenser.

4. The refrigeration circuit of claim 3 wherein the interior of said second bellows is maintained at a vacuum.

5. The refrigeration circuit of claim 2 wherein the interior of said second bellows is maintained at a vacuum.

6. The refrigeration circuit of claim 1 wherein the interior of said second bellows is maintained at a vacuum.

7. The refrigeration circuit of claim 1 wherein said valve element includes a spherical sealing element at one end and said longitudinal bore widens into a valve seat portion, said spherical sealing element and said valve seat portion cooperating to control fluid flow through said longitudinal bore.

8. The refrigeration circuit of claim 7 wherein said valve control element is a thin shank extending through said longitudinal bore, the end of said thin shank contacting said spherical sealing element of said valve element to open said valve seat.

* * * * *